United States Patent
Sauer

(10) Patent No.: US 6,866,918 B2
(45) Date of Patent: Mar. 15, 2005

(54) LAMINATED GLASS WINDSCREEN INTENDED TO BE USED AT THE SAME TIME AS A HUD SYSTEM REFLECTOR

(75) Inventor: Gerd Sauer, Stolberg (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/156,106

(22) Filed: May 29, 2002

(65) Prior Publication Data

US 2002/0172804 A1 Nov. 21, 2002

Related U.S. Application Data

(63) Continuation of application No. 09/121,844, filed on Jul. 24, 1998, now abandoned.

(30) Foreign Application Priority Data

Jul. 24, 1997 (DE) .......................................... 197 37 873

(51) Int. Cl.$^7$ ............................ B32B 3/00; G02B 27/14; G09G 5/00; B60J 1/00
(52) U.S. Cl. .................... 428/172; 428/213; 428/425.6; 428/430; 359/630; 345/7; 296/84.1
(58) Field of Search ................................ 428/156, 172, 428/213, 437, 415, 425.6, 430; 359/630; 345/7; 296/84.1, 46.12

(56) References Cited

U.S. PATENT DOCUMENTS

| | | |
|---|---|---|
| 3,762,988 A | 10/1973 | Clock et al. |
| 3,868,286 A | 2/1975 | Fariss et al. |
| 3,881,043 A | 4/1975 | Rieser et al. |
| 3,922,456 A | 11/1975 | Baldridge |
| 5,013,134 A | 5/1991 | Smith |
| 5,087,502 A | 2/1992 | Espesito et al. |
| 5,812,332 A * | 9/1998 | Freeman ..................... 359/894 |
| 5,945,199 A * | 8/1999 | Morin et al. ................. 428/156 |
| 6,534,152 B2 * | 3/2003 | Freeman ..................... 428/172 |

OTHER PUBLICATIONS

Defense Publication 861036.1019, S.N. 739939, Laminated Glass Assembly with tapered Inner layer, by H.V. Christensen.

* cited by examiner

*Primary Examiner*—Donald J. Loney
(74) *Attorney, Agent, or Firm*—Oblon, Spivak, McClelland, Maier & Neustadt, P.C.

(57) ABSTRACT

A laminated safety glass windscreen, which can also be used as a reflector in a HUD system, comprises at least first and second panes and a thermoplastic intermediate layer which joins these panes together. The cross-section of the intermediate layer is in the shape of a wedge, decreasing in thickness from top to bottom. The thermoplastic intermediate layer may be composed of two sheets, one of which is provided with a colored filtering strip and has a wedged cross-section conditioned by the appearance of this filtering strip. The other sheet has a wedged cross-section such that the two sheets together have the prescribed convergence angle for using the windscreen as a reflector.

18 Claims, 2 Drawing Sheets

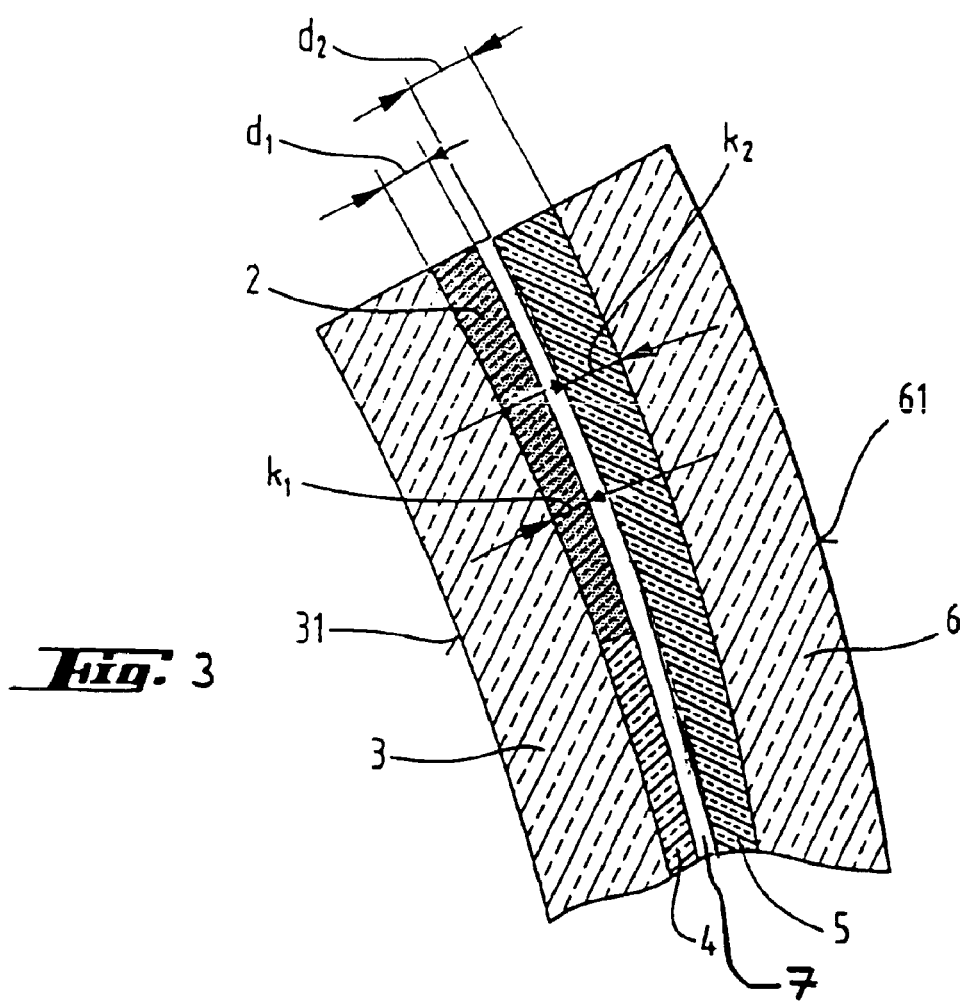

LAMINATED GLASS WINDSCREEN INTENDED TO BE USED AT THE SAME TIME AS A HUD SYSTEM REFLECTOR

BACKGROUND OF THE INVENTION

1. Field of the Invention

The present invention relates to a laminated glass windscreen having a predetermined taper angle and intended to be used at the same time as a reflector in a HUD system.

2. Discussion of the Background

It is known that the reflection of light rays from the surfaces of glass increases with the angle of incidence. In the case of windscreens which are fitted with a large angle of inclination, objects situated inside the vehicle and below the windscreen are visible to the driver in the windscreen, which acts as a mirror. This effect can be exploited, for example by projecting optical information onto the windscreen. In this regard, however, ordinary windscreens with parallel faces present the problem that the light rays, which are reflected both by the interior surface and by the exterior surface of the windscreen, present the observer with two images which are offset relative to one another.

It is known from EP 0 420 228 B1, hereby incorporated by reference, that this problem of double images can be avoided by using an intermediate layer with a wedge-shaped cross-section which makes the two reflecting surfaces of the windscreen form an angle such that the two reflected images appear superimposed to the driver's eyes. In this way, not only is a relatively sharp reflected image obtained, but the clarity of the image is also enhanced. However, the taper angle required of the intermediate layer for this purpose depends strongly on the angle at which the windscreen is fitted and on the position of the image projector in the vehicle, and therefore needs to be carefully adapted to each particular situation.

It is also known to use a thermoplastic intermediate sheet with a tinted filtering band during the manufacture of curved windscreens made of laminated glass with a filtering strip along the upper edge. The desired curvature of the filtering strip is then obtained by intentional irregular stretching of the sheet. This stretching, involving plastic deformation of the sheet, is carried out in order to adapt the profile of the filtering strip to that of the upper part of the laminated windscreen. Stretching in the shape of a circular arc leads to a taper on the long side of the curvature, which gives a sheet with a wedge-shaped cross-section. The taper angle of a sheet stretched in this way is determined by the radius required for the filtering strip. Therefore, the thermoplastic sheet with wedge-shaped cross-section formed in this way does not normally have the taper angle needed for a windscreen to be used as a reflector in a head-up display (HUD) system comprising two reflection surfaces which form a determined angle in order to superimpose the images.

SUMMARY OF THE INVENTION

An object of the invention is to provide a laminated glass window which contains a tinted filtering strip integrated with the thermoplastic intermediate sheet, whose curvature is adapted to that of the upper edge of the laminated glass pane and whose two panes also form, relative to one another, an angle such that they serve as a reflector in a head-up display system, resulting in two reflected images which are superimposed with a view to enhancing brightness and avoiding a double image.

This object is achieved with an intermediate layer comprising at least two thermoplastic sheets, one of which is provided along its upper edge with a tinted filtering strip, and the other has a wedge-shaped cross-section such that the two sheets together have the desired taper angle.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 is a view in section on the axis II—II in FIG. 1, of an embodiment different from that of FIG. 2.

DETAILED DESCRIPTION OF THE INVENTION

A laminated glass window according to the invention has the advantage that the two reflecting surfaces can be arranged relative to one another with a predetermined taper angle, with a view to using the windscreen as a reflector in a HUD system, irrespective of the taper angle already presented by the thermoplastic sheet with the incorporated tinted filtering strip.

It is also possible for the laminated glass windscreen to have a straight edge at the filtering strip. In this case, the sheet comprising the filtering strip does not need to be stretched, and consequently no longer has a wedge-shaped cross-section. The required taper angle is then produced only by the other sheet.

According to a further advantageous embodiment of the invention, a support sheet comprising a functional layer is placed between the thermoplastic sheets which together form the defined taper angle. This support sheet may, for example, be made of polyethylene terephthalate (PET) and be provided with a coating which reflects infrared wavelengths, but is transparent to other wavelengths.

The taper angles required of the thermoplastic sheets may be obtained by stretching with plastic deformation, but it is also possible to use sheets originally extruded with a wedge-shaped cross-section. The sheet provided with the tinted filtering strip may itself also be extruded with a wedge-shaped cross-section.

When the sheets are being drawn to give them the necessary radii of curvature, which may be as little as 2 m, it is clearly necessary to take care that the two sheets together have a minimum thickness in order to retain a safety functions and adhesion properties. A person of ordinary skill in the art can easily select a suitable thickness for the sheets.

A variety of commercially available polymer sheets may be used as thermoplastic sheets which together are to form the determined taper angle. In particular, polyvinyl butyral and polyurethane sheets are suitable.

Having generally described this invention, a further understanding can be obtained by reference to certain specific examples which are provided herein for purposes of illustration only and are not intended to be limiting unless otherwise specified.

Figure 1:
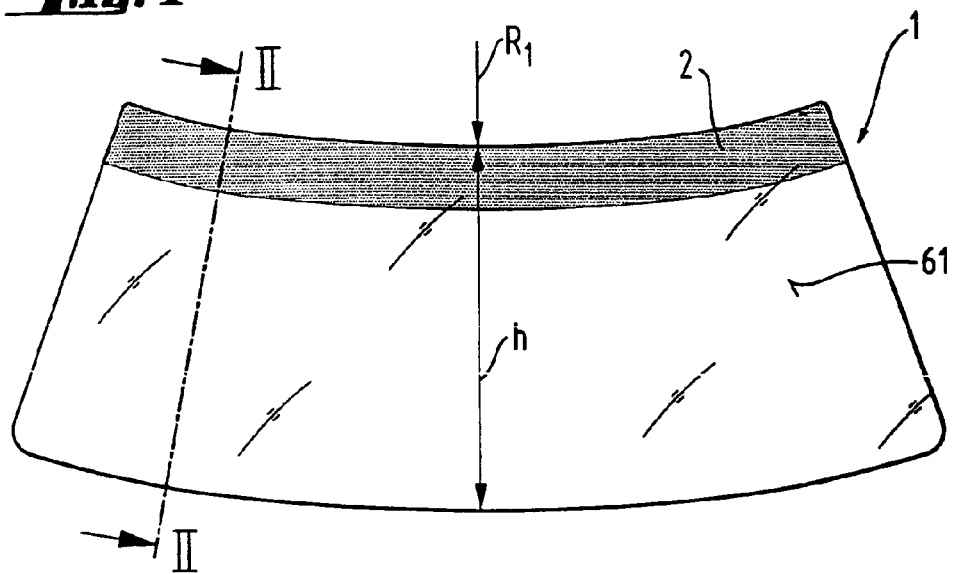
FIG. 1 is a front view of a windscreen with a tinted filtering strip.
Figure 2:
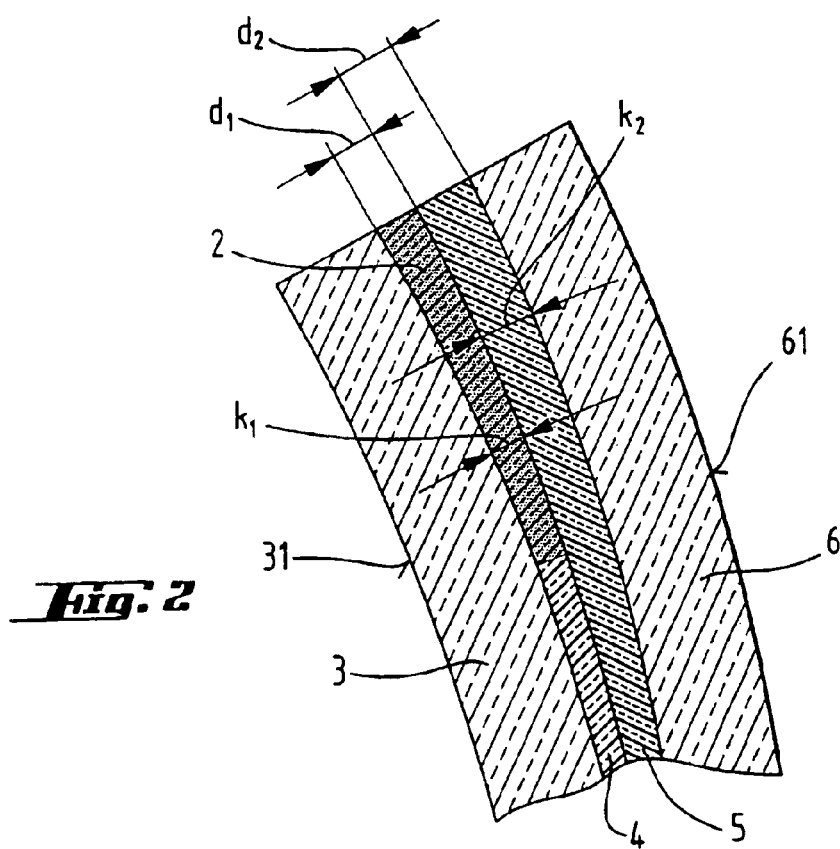
FIG. 2 is a view in section on the axis II—II in FIG. 1.

Referring to FIG. 1, the windscreen 1 is provided along its upper edge with a tinted filtering strip 2. As illustrated in FIG. 2, this windscreen may be produced with a taper angle θ in order to ensure superimposed reflection of an image by the exterior surfaces 31 and 61 of the panes 3 and 6. In this example, the taper angle θ is selected to be 0.5 mrad.

At its upper edge, the laminated glass windscreen 1 has a radius $R_1$ of 3.30 m, and its height h is 0.80 m. The thermoplastic sheet 4 comprising the tinted filtering strip 2 is made of polyvinyl butyral (PVB). Initially, it has an overall thickness and, after drawing on its upper edge, of 0.76 mm ($d_1$). From the geometrical ratios and prescribed data, it is possible to deduce the taper angle $k_1$ which is obtained by stretching the PVB sheet 4 with the desired radius of curvature $R_1$, using the formula:

$$k_1 = \frac{d_1}{R_1 + h}$$

where $d_1$ is the initial thickness of the sheet, $R_1$ is the radius of curvature at the upper edge, and h is the height of the sheet, which gives $k_1$=0.185 mrad.

In order to obtain the required taper angle θ of 0.5 mrad, it is necessary to add a second thermoplastic sheet 5, also made of PVB, having a taper angle $k_2$ of 0.315 mrad, such that 0.5 mrad=θ=$k_1$+$k_2$. For an initial thickness $d_2$=1.52 mm of the second sheet, the relation:

$$R_2 = \frac{d_2}{k_2} - h$$

gives, for this sheet, a required stretching radius of 4.025 m.

The two stretched thermoplastic sheets 4 and 5 are arranged in such a way that the taper angles $k_1$ and $k_2$ are added to give the stipulated angle of θ=0.5 mrad. The sheets are then assembled in the conventional way with the curved panes 3 and 6 to form a laminated glass windscreen which exhibits the required taper angle of 0.5 mrad.

The specific values $R_1$, h, and $d_1$ are easily selected by those of ordinary skill in the art, and in part depend on dimensions of the specific vehicle in which the windscreen is intended to be used. As an example, $R_1$ may be 2–4 m, h may be 0.40–1.6 m, and $d_1$ may be 0.10–2.50 mm. Similarly $d_2$ may be 0.10–2.50 mm.

A third sheet may be included, such as a support sheet comprising a functional layer, between the thermoplastic sheets. Such an embodiment is illustrated in FIG. 3, where the support sheet 7, is between the thermoplastic sheets 4 and 5.

Obviously, numerous modifications and variations of the present invention are possible in light of the above teachings. It is therefore to be understood that within the scope of the appended claims, the invention may be practiced otherwise than as specifically described herein.

The priority document of the present application, German Patent Application No. 197 31 873.8, filed on Jul. 24, 1997, is hereby incorporated by reference.

What is claimed is:

1. A laminated glass windscreen having a taper angle for a reflector in a HUD system, comprising:
   (i) a first pane,
   (ii) a second pane, and
   (iii) a intermediate layer having a wedge-shaped cross-section, between said first and second panes, comprising
      (a) a first thermoplastic sheet comprising a tinted filtering strip at an upper edge of said first thermoplastic sheet, and
      (b) a second thermoplastic sheet, on said first thermoplastic sheet, wherein said second thermoplastic sheet has a wedge-shaped cross-section;
   wherein said intermediate layer further comprises a support sheet comprising a functional layer, between said first thermoplastic sheet and said second thermoplastic sheet; and
   wherein said support sheet comprises polyethylene terephthalate.

2. The laminated glass windscreen of claim 1, wherein said first thermoplastic sheet has a taper angle of 0 mrad.

3. The laminated glass windscreen of claim 1, wherein said first thermoplastic sheet has a wedge-shaped cross-section.

4. The laminated glass windscreen of claim 1, wherein said first thermoplastic sheet comprises a polymer selected from the group consisting of polyvinyl butyral and polyurethane.

5. The laminated glass windscreen of claim 1, wherein said second thermoplastic sheet comprises a polymer selected from the group consisting of polyvinyl butyral and polyurethane.

6. The laminated glass windscreen of claim 4, wherein said second thermoplastic sheet comprises a polymer selected from the group consisting of polyvinyl butyral and polyurethane.

7. The laminated glass windscreen of claim 1, wherein said first thermoplastic sheet comprises polyvinyl butyral, and said second thermoplastic sheet comprises polyvinyl butyral.

8. A method of making the laminated glass windscreen of claim 1, comprising:
   laminating said first pane, said intermediate layer and said second pane.

9. The method of claim 8, further comprising, prior to said laminating, stretching to form said first thermoplastic sheet with a wedge-shaped cross-section.

10. The method of claim 8, further comprising, prior to said laminating, extruding to form said second thermoplastic sheet in a wedge shape.

11. The method of claim 9, further comprising, prior to said laminating, extruding to form said second thermoplastic sheet in a wedge shape.

12. The method of claim 8, further comprising, prior to said laminating, stretching to form said second thermoplastic sheet with a wedge-shaped cross-section.

13. The method of claim 9, further comprising, prior to said laminating, stretching to form said second thermoplastic sheet with a wedge-shaped cross-section.

14. A method of displaying an image, comprising:
   projecting an image on the laminated glass windscreen of claim 1.

15. A vehicle, including the laminated glass windscreen of claim 1.

16. A method of displaying an image, comprising:
   projecting an image on a windscreen of a vehicle, wherein said windscreen is the laminated glass windscreen of claim 1, and
   reflections of said image from said first pane and said second pane appear superimposed to a driver of said vehicle.

17. The laminated glass windscreen of claim 1, wherein said second thermoplastic sheet (b) is untinted.

18. A laminated glass window as set forth in claim 3 wherein the taper angle of said combined first and second sheets is 0.5 mrad.

* * * * *